Oct. 25, 1932.  R. K. LEE  1,883,994
STEP PLATE
Filed Nov. 29, 1929

INVENTOR
BY ROGER. K. LEE.
ATTORNEY

Patented Oct. 25, 1932

1,883,994

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

STEP PLATE

Application filed November 29, 1929. Serial No. 410,549.

This invention relates to a step plate and is illustrated as embodied in a running board for a motor vehicle body.

Heretofore running board mats, with or without raised portions have been secured to the upper surface of a running board but considerable difficulty has been experienced in securely fastening these mats to a suitable base. It is therefore an important object of my invention to provide an inexpensive step plate having raised portions which may be easily assembled on a substantially flat plate or body portion.

Another object of my invention is to provide non-metallic raised portions such as rubber which will prevent a person from slipping when stepping thereon.

Other objects and advantages of the invention will more fully appear from the following description taken in connection with the accompanying drawing, in which.

Figure 1:
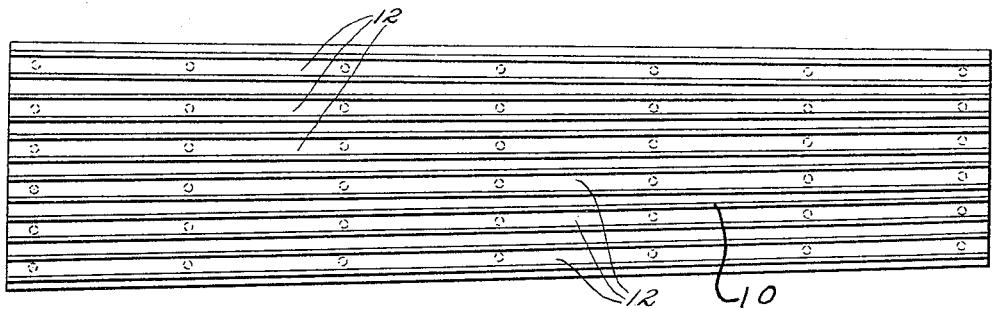
Fig. 1 is a plan view of a running board for a motor vehicle body.
Figure 2:
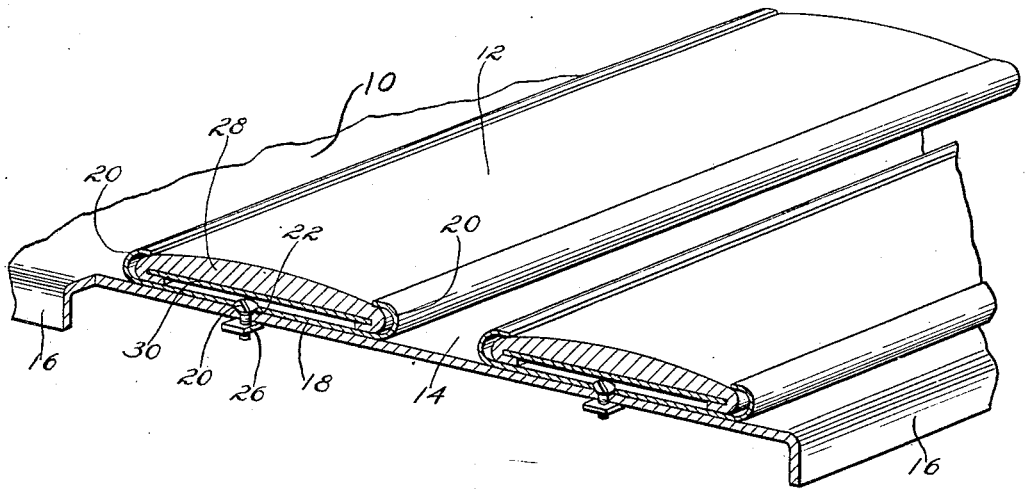
Fig. 2 is an enlarged perspective view, partly in section, showing the running board.

In the illustrated embodiment of my invention, I have shown an automobile running board 10 having a plurality of longitudinally extending treads 12 which are detachably secured to a base or body portion 14. The base may be formed in any suitable manner. As shown, it comprises a substantially flat plate having marginal flanges 16 which reinforce the plate, preferably made of pressed metal.

The treads 12 are detachably secured to the base 14 and comprise a metal channel shaped member 18 having its edges bent upwardly and inwardly as at 20. The channel 18 is provided with openings 22 which receive securing members such as rivets or screws 24. The screws 24 extend through openings in the base plate 14 and nuts 26, screw threaded on the screws 24, secure the channels to the base.

The non-metallic tread member 12 preferably consists of a strip of rubber 28 moulded to a reinforcing strip 30. The marginal edges of the strip 30 are embraced by the rubber strip 28 and the two strips may be forced into the channel 18 as a unit, frictionally held therein by the inwardly turned flanges 20.

If desired the rubber strip, with or without the reinforcing strip 30, may be forced into the channel 18 before the latter is secured to the base plate 14, or the channel 18 may be secured to the base 14 and the rubber strip forced into the channel. The appearance of the running board may be improved by nickel or chromium plating the outer surfaces of the flanges 20 with the exposed portion of the base 14 being painted either in color or black enamel.

Various changes including the size, shape and arrangement of parts may be made without departing from the spirit of my invention and it is my intention to cover by my claims such changes as may be reasonably made without departing from the scope of my invention.

What I claim is:

1. A step plate having a metallic body portion, a metallic channel having upwardly and inwardly extending side flanges, means for detachably securing said channel to said body portion, a rubber strip having a width greater than the distance between the outer edges of the side flanges adapted to be pressed into the channel between the side flanges, and over said securing means, and a metallic reinforcing strip for the rubber strip on the under surface of said rubber strip.

2. A step plate having a metallic body portion, a metallic channel having upwardly and inwardly extending side flanges, means for detachably securing said channel to said body portion, a rubber strip having a width greater than the distance between the outer edges of the side flanges adapted to be pressed into the channel between the side flanges, and over said securing means, and a metallic reinforcing strip for the rubber strip having a width equal to or greater than the distance between the inner edges of the side flanges.

ROGER K. LEE.